United States Patent
Park et al.

(10) Patent No.: US 9,445,311 B2
(45) Date of Patent: Sep. 13, 2016

(54) METHOD AND APPARATUS FOR TRANSMITTING INDICATION IN WIRELESS COMMUNICATION SYSTEM

(71) Applicant: LG ELECTRONICS INC., Seoul (KR)

(72) Inventors: Kyungmin Park, Anyang-si (KR); Daewook Byun, Anyang-si (KR); Jian Xu, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 14/387,180

(22) PCT Filed: Jun. 21, 2013

(86) PCT No.: PCT/KR2013/005500
§ 371 (c)(1),
(2) Date: Sep. 22, 2014

(87) PCT Pub. No.: WO2013/191505
PCT Pub. Date: Dec. 27, 2013

(65) Prior Publication Data
US 2015/0049734 A1  Feb. 19, 2015

Related U.S. Application Data

(60) Provisional application No. 61/662,936, filed on Jun. 22, 2012.

(51) Int. Cl.
*H04W 4/00* (2009.01)
*H04W 36/00* (2009.01)
(Continued)

(52) U.S. Cl.
CPC ..... *H04W 36/0005* (2013.01); *H04W 36/0055* (2013.01); *H04W 36/08* (2013.01); *H04W 76/046* (2013.01); *H04W 84/047* (2013.01)

(58) Field of Classification Search
CPC .......... H04W 36/0005; H04W 36/08; H04W 36/0055; H04W 76/046; H04W 84/047
See application file for complete search history.

(56) References Cited

U.S. PATENT DOCUMENTS

| | | | |
|---|---|---|---|
| 8,805,370 B1* | 8/2014 | Kannan | H04L 12/66 370/254 |
| 2001/0004604 A1* | 6/2001 | Toshimitsu | H01Q 1/246 455/562.1 |

(Continued)

OTHER PUBLICATIONS

Pietsch, et al., "Moving Relays and Mobility aspects," Advanced Radio InTerface Technologies for 4G SysTems ARTIST4G, May 2012, 60 pages.

(Continued)

*Primary Examiner* — Kevin Mew
(74) *Attorney, Agent, or Firm* — Lee, Hong, Degerman, Kang & Walmey; Jonathan Kang; Michael Monaco

(57) ABSTRACT

A method and corresponding apparatus for transmitting an indication in a wireless communication system. In the method, a source donor eNodeB (DeNB) transmits a first handover request message for a mobile relay node, to a target DeNB, and transmits a second handover request message for user equipments (UEs) attached to the mobile relay node, to a target eNB. The source DeNB transmits an indication including information on lists of UEs which can be handed over to the target eNB, to the mobile relay node, and the mobile relay node transmits a radio resource control (RRC) connection reconfiguration message indicating a UE to handover to the target eNB.

15 Claims, 15 Drawing Sheets

(51) Int. Cl.
*H04W 36/08* (2009.01)
*H04W 76/04* (2009.01)
*H04W 84/04* (2009.01)

(56) References Cited

U.S. PATENT DOCUMENTS

| | | | | |
|---|---|---|---|---|
| 2007/0280188 A1* | 12/2007 | Kang | ............... | H04B 7/155 370/338 |
| 2009/0111470 A1* | 4/2009 | Thakare | ............ | H04W 36/0055 455/436 |
| 2011/0281581 A1* | 11/2011 | Brandt | ............... | H04W 36/08 455/427 |
| 2012/0002637 A1* | 1/2012 | Adjakple | .......... | H04W 36/0055 370/331 |
| 2012/0087338 A1* | 4/2012 | Brandt | ............. | H04W 36/0055 370/331 |
| 2012/0135709 A1* | 5/2012 | Deng | ............... | H04W 36/0016 455/411 |
| 2012/0140700 A1 | 6/2012 | Huang | | |
| 2013/0196666 A1* | 8/2013 | Zhang | .............. | H04W 36/0005 455/436 |
| 2013/0231086 A1* | 9/2013 | Naik | ................ | H04W 36/0055 455/411 |
| 2013/0322325 A1* | 12/2013 | Hahn | ............... | H04W 36/0055 370/315 |
| 2014/0023045 A1* | 1/2014 | Li | .................... | H04W 36/0055 370/331 |
| 2014/0192771 A1* | 7/2014 | Jung | .................... | H04W 36/08 370/331 |
| 2014/0287726 A1* | 9/2014 | Jang | .................. | H04W 36/0083 455/411 |
| 2015/0023319 A1* | 1/2015 | Park | .................. | H04W 36/0055 370/331 |
| 2015/0109927 A1* | 4/2015 | Ozturk | ............. | H04W 36/0027 370/235 |
| 2016/0037398 A1* | 2/2016 | Li | ..................... | H04W 36/0055 455/436 |
| 2016/0044559 A1* | 2/2016 | Xu | ................... | H04W 36/0055 370/331 |

OTHER PUBLICATIONS

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.3.0, Mar. 2011, 198 pages.

Chen, et al., "A Secure Relay-Assisted Handover Protocol for Proxy Mobile IPv6 in 3GPP LTE Systems," Wireless Personal Communications 2011, vol. 61, No. 4, 31 pages.

PCT International Application No. PCT/KR2013/005500, Written Opinion of the International Searching Authority dated Sep. 30, 2013, 1 page.

* cited by examiner

FIG. 3
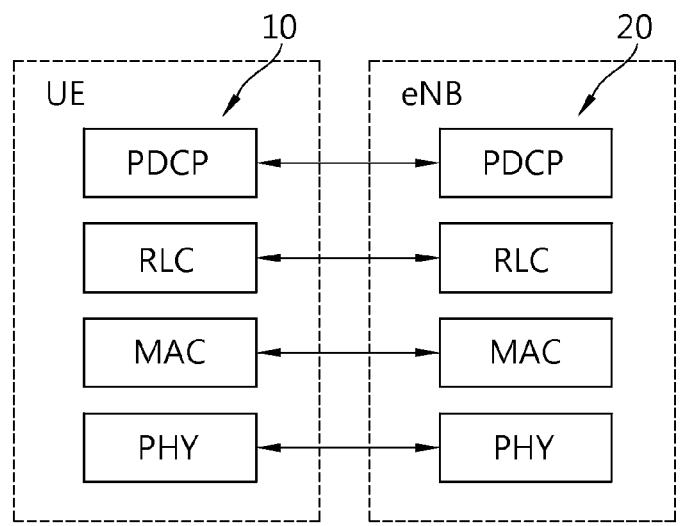
(a)
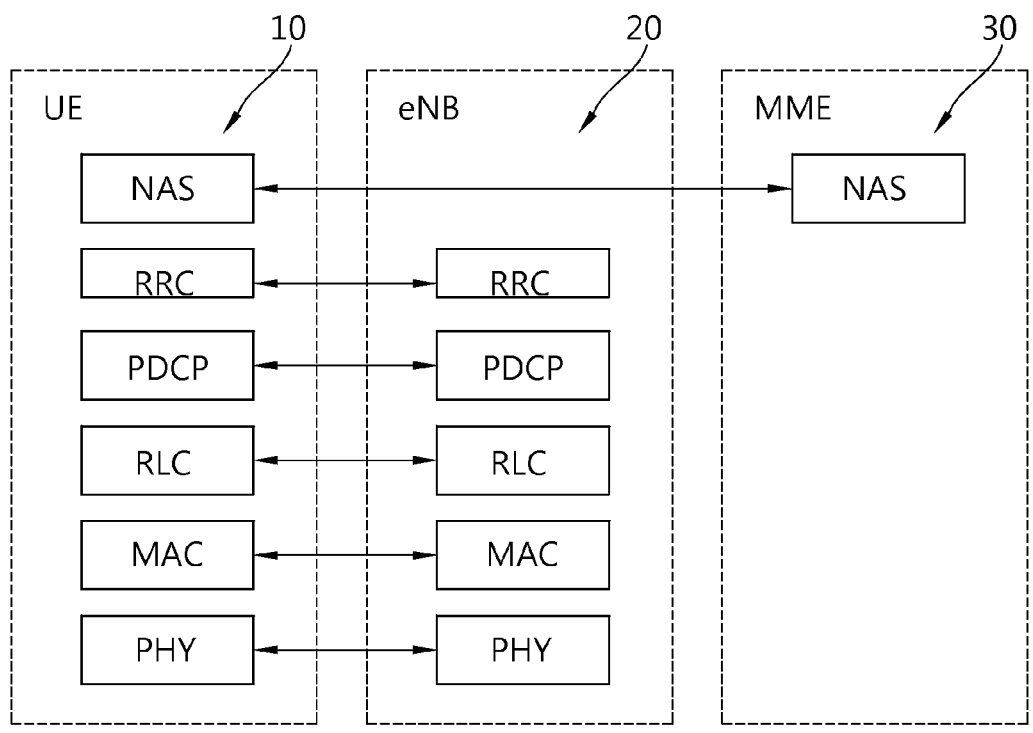
(b)

METHOD AND APPARATUS FOR TRANSMITTING INDICATION IN WIRELESS COMMUNICATION SYSTEM

CROSS-REFERENCE TO RELATED APPLICATIONS

This application is the National Stage filing under 35 U.S.C. 371 of International Application No. PCT/KR2013/005500, filed on Jun. 21, 2013, which claims the benefit of U.S. Provisional Application Ser. No. 61/662,936, filed on Jun. 22, 2012, the contents of which are all hereby incorporated by reference herein in their entirety.

BACKGROUND OF THE INVENTION

1. Field of the Invention

The present invention relates to wireless communication, and more particularly, to a method and apparatus for transmitting an indication in a wireless communication system.

2. Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a user-plane protocol and a control-plane protocol stack for the E-UMTS.

FIG. 3(*a*) is block diagram depicting the user-plane protocol, and FIG. 3(*b*) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer illustrated in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARQ). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

3GPP LTE-A may supports relaying by having a relay node (RN) wirelessly connect to an eNB serving the RN. It may be referred to paragraph 4.7 of 3rd generation partnership project (3GPP) TS 36.300 V10.2.0 (2010-12).

FIG. 5 shows an objective of relay.

Referring to FIG. 5, a relay node (RN) wirelessly communicates with an eNB supporting relay, and thus can support capacity assistance of a shadow region or coverage extension through a service for UEs located in a cell boundary region and outside the boundary region. The eNB serving the RN may be referred as a donor eNB (DeNB). The DeNB requires several additional functions for supporting relay. When there is an access of the relay node, the DeNB can perform a reconfiguration task to provide information required for relay and system information through dedicated signaling. The DeNB and the RN may be connected via a modified version of the E-UTRA radio interface. The modified version may be referred as a Un interface.

The RN may support eNB functionality. It means that the RN terminates the radio protocols of the E-UTRA radio interface, and S1 and X2 interfaces. In addition to the eNB functionality, the RN may also support a subset of UE functionality, e.g., a physical layer, layer-2, RRC, and NAS functionality, in order to wirelessly connect to the DeNB. That is, the relay node can operate as a relay-type UE with respect to the DeNB, and can operate as an eNB with respect to a served UE.

FIG. 6 shows an overall E-UTRAN architecture supporting relay nodes.

Referring to FIG. 6, the LTE-A network includes an E-UTRAN, an EPC and one or more user equipment (not described). The E-UTRAN may include one or more relay node (RN) 50, one or more DeNB 60, one or more eNB 61 and a plurality of UE may be located in one cell. One or more E-UTRAN MME/S-GW 70 may be positioned at the end of the network and connected to an external network.

As used herein, "downlink" refers to communication from the eNB 61 to the UE, from the DeNB 60 to the UE or from the RN 50 to the UE, and "uplink" refers to communication from the UE to the eNB 61, from the UE to the DeNB 60 or from the UE to the RN 50. The UE refers to communication equipment carried by a user and may be also referred to as a mobile station (MS), a user terminal (UT), a subscriber station (SS) or a wireless device.

The eNB 61 and the DeNB 60 provide end points of a user plane and a control plane to the UE. The MME/S-GW 70 provides an end point of a session and mobility management function for UE. The eNB 61 and the MME/S-GW 70 may be connected via an S1 interface. The DeNB 60 and MME/SAE gateway 70 may be connected via an S1 interface. The eNBs 61 may be connected to each other via an X2 interface and neighboring eNBs may have a meshed network structure that has the X2 interface. The eNB 61 and the DeNB 60 may be connected to each other via an X2 interface.

The RN 50 may be wirelessly connected to the DeNB 60 via a modified version of the E-UTRA radio interface being called the Un interface. That is, the RN 50 may be served by the DeNB 60. The RN 50 may support the eNB functionality which means that it terminates the S1 and X2 interfaces. Functionality defined for the eNB 61 or the DeNB 60, e.g. radio network layer (RNL) and transport network layer (TNL), may also apply to RNs 50. In addition to the eNB functionality, the RN 50 may also support a subset of the UE functionality, e.g. physical layer, layer-2, RRC, and NAS functionality, in order to wirelessly connect to the DeNB 60.

The RN 50 may terminate the S1, X2 and Un interfaces. The DeNB 60 may provide S1 and X2 proxy functionality between the RN 50 and other network nodes (other eNBs, MMEs and S-GWs). The S1 and X2 proxy functionality may include passing UE-dedicated S1 and X2 signaling messages as well as GTP data packets between the S1 and X2 interfaces associated with the RN 50 and the S1 and X2 interfaces associated with other network nodes. Due to the proxy functionality, the DeNB 60 appears as an MME (for S1) and an eNB (for X2) to the RN 50.

The DeNB 60 may also embed and provides the S-GW/P-GW-like functions needed for the RN operation. This includes creating a session for the RN 50 and managing EPS bearers for the RN 50, as well as terminating the S11 interface towards the MME serving the RN 50.

The RN 50 and the DeNB 60 may also perform mapping of signaling and data packets onto EPS bearers that are setup for the RN. The mapping may be based on existing QoS mechanisms defined for the UE and the P-GW.

The relay node may be classified to a fixed relay node and a mobile relay node. The mobile relay node may be applied to the 3GPP LTE rel-11. One of the possible deployment scenarios of mobile relay node is high speed public transportation, e.g., a high speed railway. That is, the mobile relay node may be put on the top of a high speed train. Hence, it is easily expected that the provision of various good quality services towards the users on a high speed public transportation will be important. Meanwhile, the service requirements offered by the fixed relay node seem to be different from those offered by the mobile relay node. So, there might be a few of considerations that should be resolved in the mobile relay node. The solutions to resolve these considerations for mobile relay node may have impacts on a radio access network (RAN).

FIG. 7 shows an example of deployments scenario of a mobile relay node at a high speed train.

Referring to FIG. 7, a mobile relay node is installed in a high speed train. Coverage of the mobile relay node may correspond to the entirety of the high speed train or each of cars constituting the high speed train. The mobile relay node can communicate with UEs in the high speed train through an access link. At present, the mobile relay node is in coverage of an eNB1 supporting relay. The mobile relay node can communicate with the eNB1 through a backhaul link. When the high speed train moves, the mobile relay node may enter coverage of an eNB2 supporting relay. Accordingly, the mobile relay node can be handed over from the eNB1 to the eNB2.

A handover procedure may be performed when a relay node is deployed. To support the handover procedure when the relay node is deployed, a target DeNB should have resources to be allocated to UEs, which are attached to the relay node and request a handover to the target DeNB. If the target DeNB does not have resource to be allocated to UEs, the target DeNB may reject a handover request of UEs. Meanwhile, if the relay node is a mobile relay node, the mobile relay node may be handed over to the target DeNB quickly since the mobile relay node may be generally deployed in a high speed railway. Therefore, handover failure of UEs may occur.

Accordingly, a method for avoiding UE connection failure in a handover procedure when a mobile relay node is deployed is required.

SUMMARY OF THE INVENTION

The present invention provides a method for transmitting an indication in a wireless communication system. The present invention provides a method for transmitting an indication including information on lists of UEs which can be handed over to a target eNB when the UEs cannot be provided any beare at the target DeNB.

In an aspect, a method for transmitting, by a source donor eNodeB (DeNB), an indication in a wireless communication system is provided. The method includes transmitting a first handover request message for a mobile relay node, to a target DeNB, transmitting a second handover request message for user equipments (UEs) attached to the mobile relay node, to a target eNB, and transmitting an indication including information on lists of UEs which can be handed over to the target eNB, to the mobile relay node.

The information on the lists of the UEs which can be handed over to the target eNB may be lists of UEs which are allowed, by the target eNB, to be handed over to the target eNB.

The information on the lists of the UEs which can be handed over to the target eNB may be lists of UEs which are decided, by the source DeNB, to be handed over to the target eNB.

The first handover request message and the second handover request message may be transmitted at the same time.

The second handover request message may be transmitted after the source DeNB transmits the first handover request message to the target DeNB and receives a first handover request acknowledgement message from the target DeNB.

The first handover request acknowledgement message may include available resource at the target DeNB.

The second handover request message may be for UEs which cannot be served by the target DeNB.

The method may further include a radio resource control (RRC) connection reconfiguration message, to the mobile relay node, including mobility control information for the mobile relay node.

The indication may be transmitted by being included in the RRC connection reconfiguration message.

In another aspect, a method for indicating, by a mobile relay node, handover in a wireless communication system is provided. The method include receiving an indication including information on lists of user equipments (UEs) which can be handed over to a target eNB, from a source donor eNodeB (DeNB), and transmitting a first radio resource control (RRC) connection reconfiguration message, to a UE, including mobility control information for the UE. The first RRC connection reconfiguration message indicates the UE to handover to the target eNB.

The information on the lists of the UEs which can be handed over to the target eNB may be lists of UEs which are allowed, by the target eNB, to be handed over to the target eNB.

The information on the lists of the UEs which can be handed over to the target eNB may be lists of UEs which are decided, by the source DeNB, to be handed over to the target eNB.

The method may further include a second RRC connection reconfiguration message, from the source DeNB, including mobility control information for the mobile relay node.

The indication may be received by being included in the second RRC connection reconfiguration message.

The method may further include an RRC connection reconfiguration complete message to a target DeNB.

UE connection failure in a handover procedure when a mobile relay node is deployed can be avoided.

BRIEF DESCRIPTION OF THE DRAWINGS

FIG. 3 shows a user-plane protocol and a control-plane protocol stack for the E-UMTS.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Various mobile relay architectures for supporting a mobile relay node may be proposed. It is natural that all of mobile relay architectures focus on how to provide a relay node handover. Nevertheless, it is important to consider the handover for user equipments (UEs) connected to the mobile relay node, analyzing the proposed mobile relay architectures.

Figure 1:
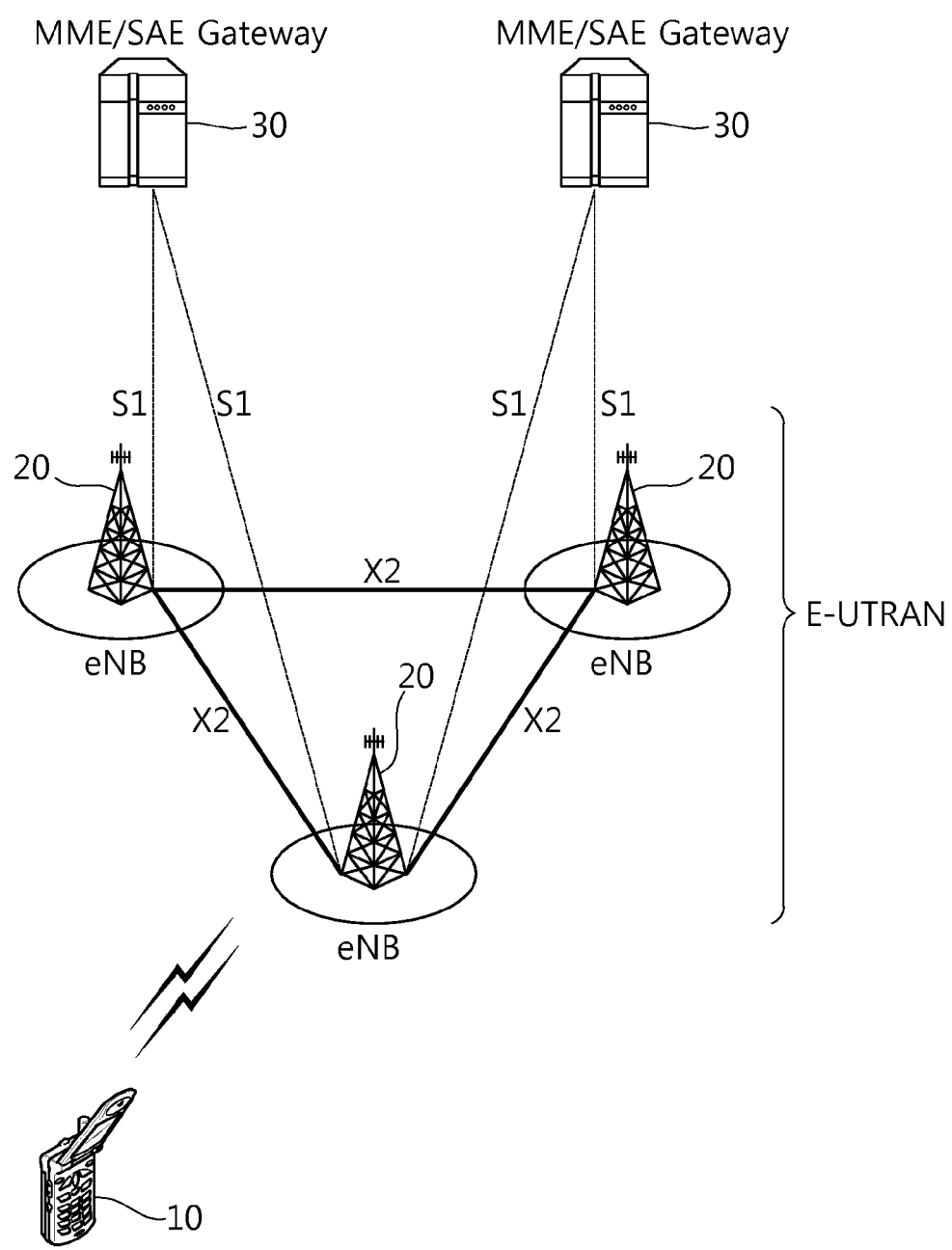
FIG. 1 shows network structure of an evolved universal mobile telecommunication system (E-UMTS).
Figure 2:
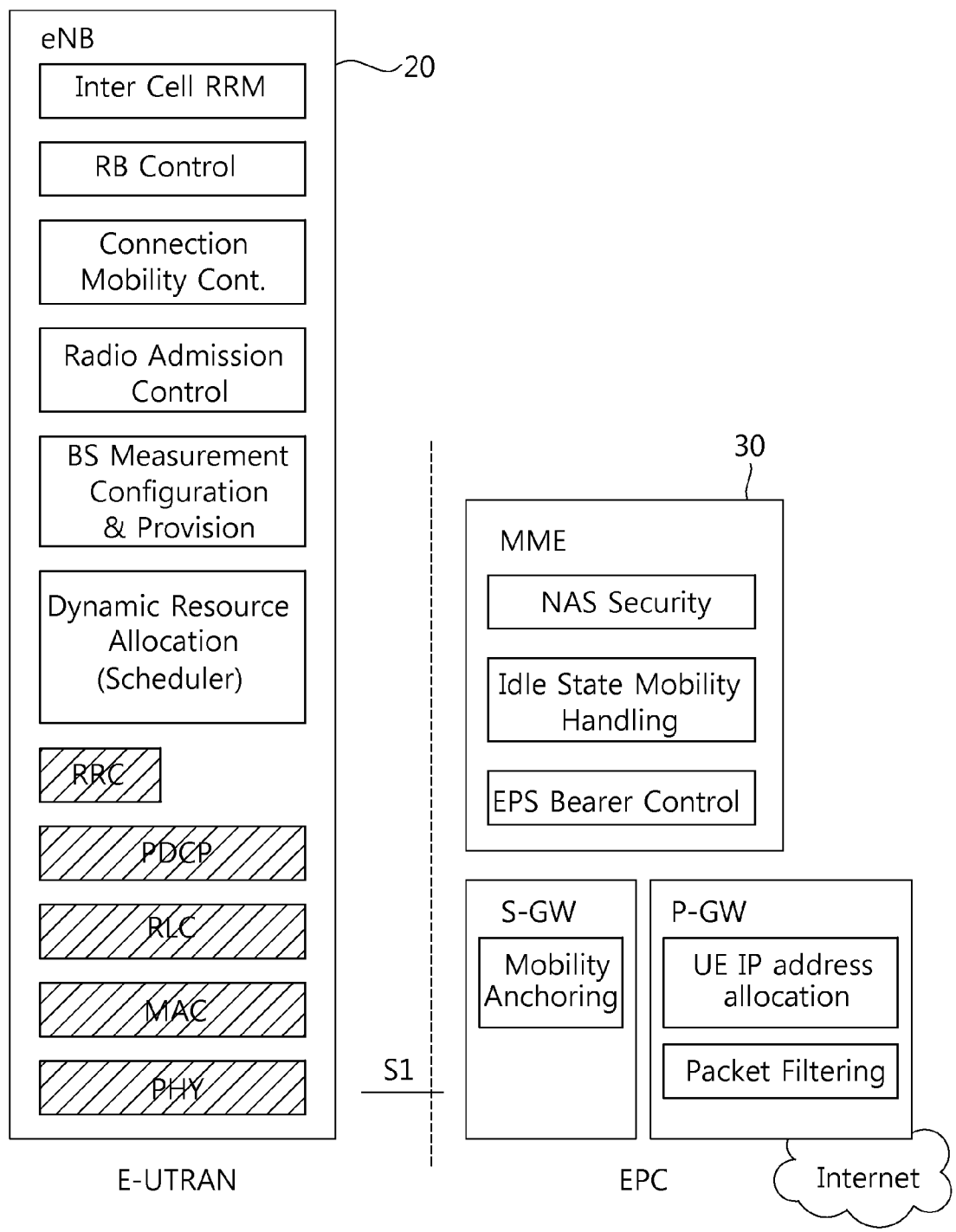
FIG. 2 shows architecture of a typical E-UTRAN and a typical EPC.
Figure 4:
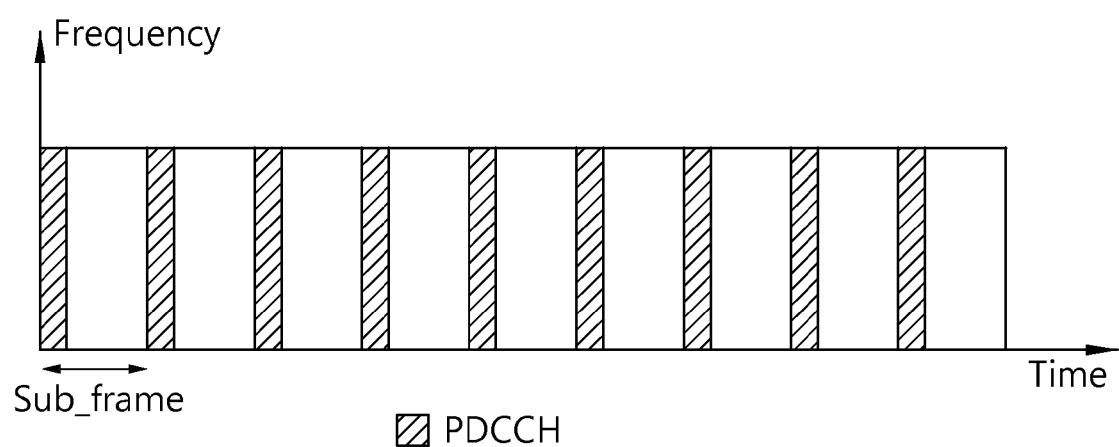
FIG. 4 shows an example of structure of a physical channel.
Figure 5:
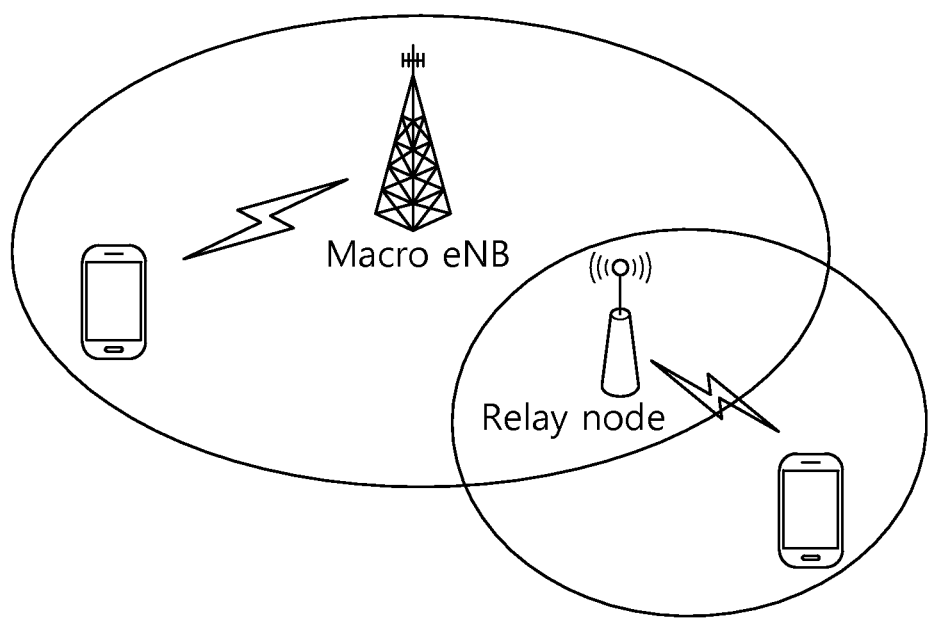
FIG. 5 shows an objective of relay.
Figure 6:
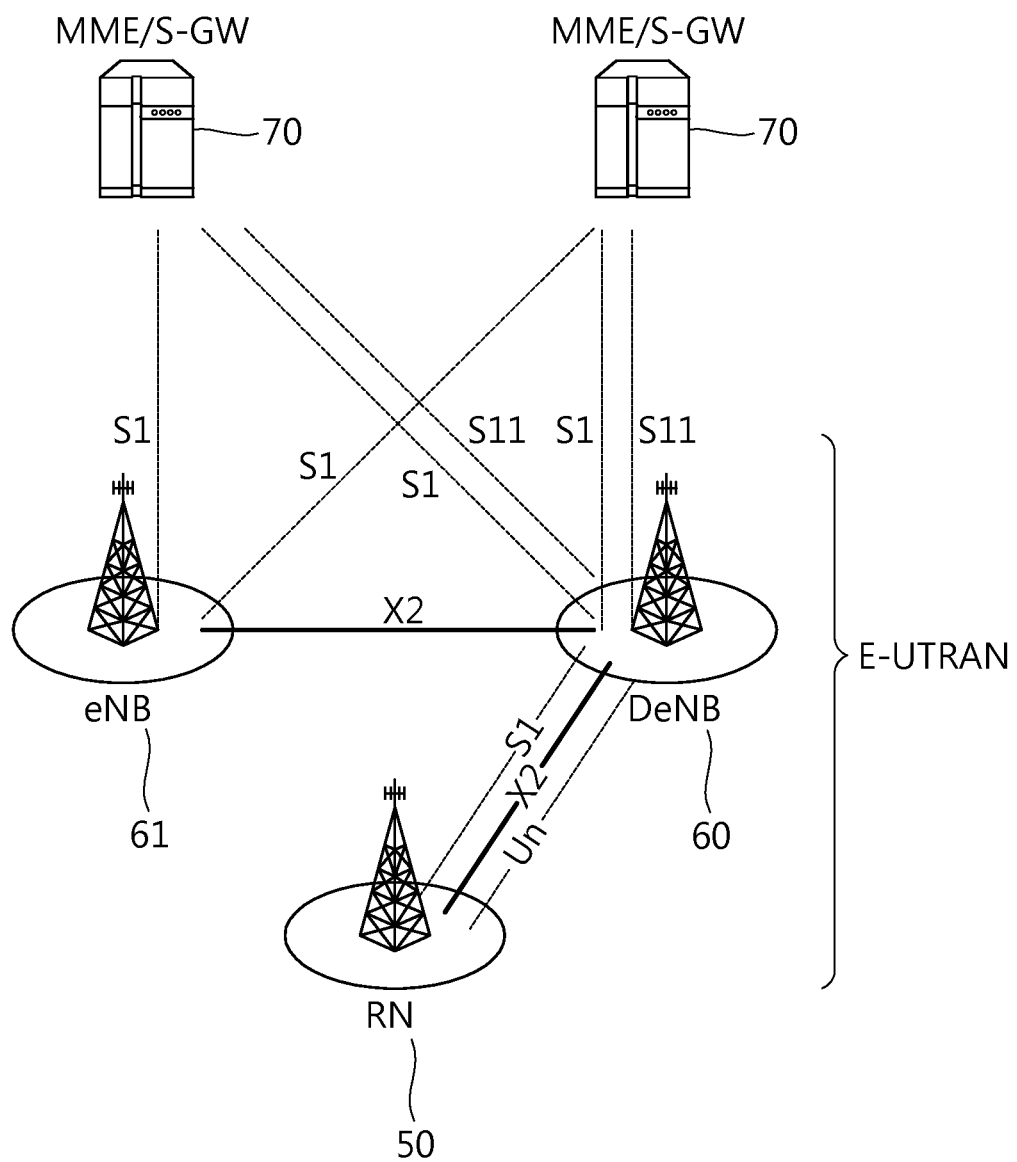
FIG. 6 shows an overall E-UTRAN architecture supporting relay nodes.
Figure 7:
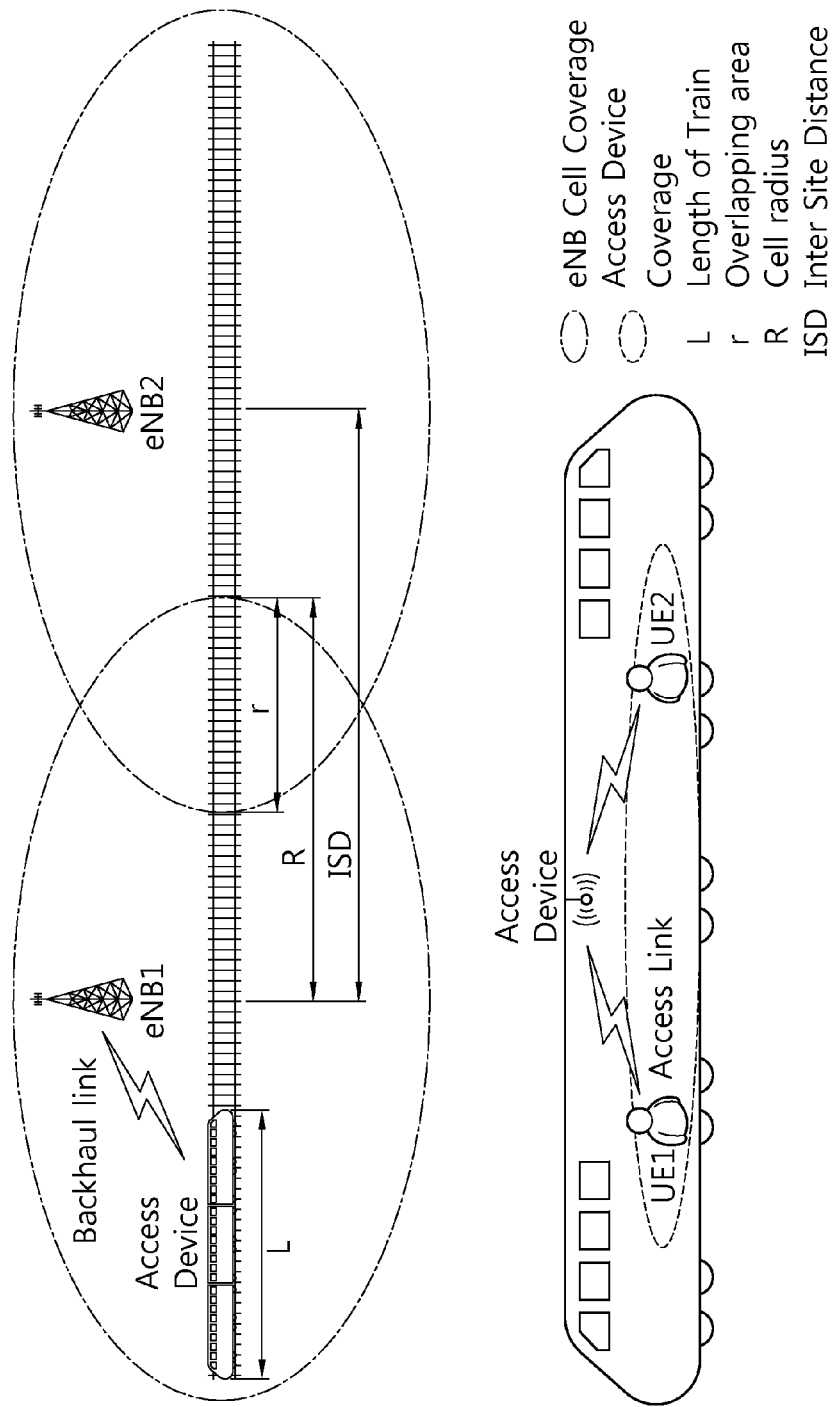
FIG. 7 shows an example of deployments scenario of a mobile relay node at a high speed train.
Figure 8:
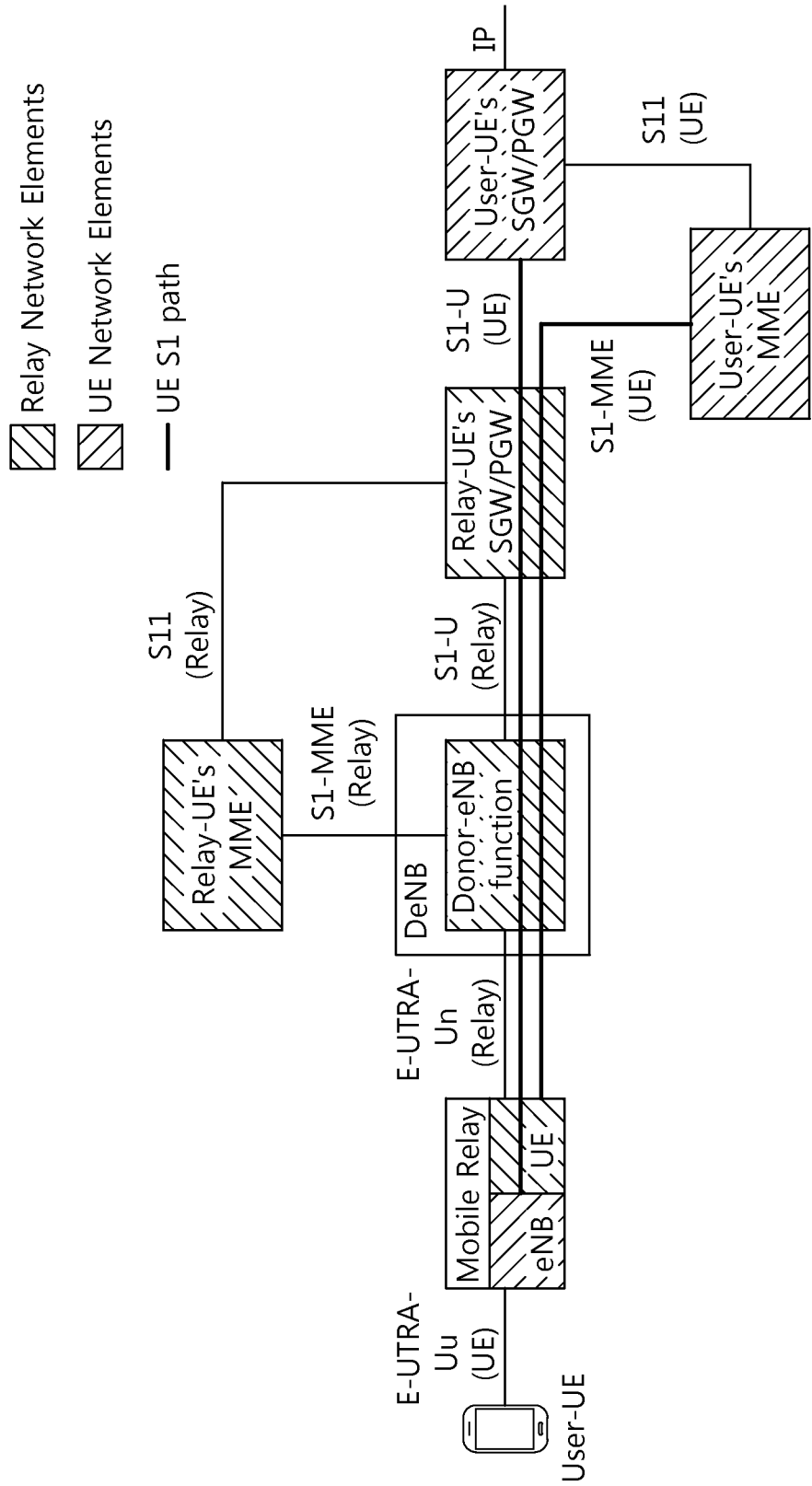
FIG. 8 shows an example of mobile relay node architecture.

FIG. 8 shows an example of mobile relay node architecture.

Referring to FIG. 8, a mobile relay node has both an eNodeB (eNB) network element and a UE network element. That is, the mobile relay node supports eNB functionalities and UE functionalities. Also, a serving gateway (S-GW)/packet data network (PDN) gateway (P-GW) of the mobile relay node is located at a core network, not in a DeNB supporting the mobile relay node. In this case, the DeNB supporting the mobile relay node cannot know the control signal and the data traffic related to the UEs connected to the mobile relay node. That is, the DeNB does not know contexts of UEs attached to the mobile relay node. It is because that an S1 interface and the signaling connections are spanning from the S-GW/P-GW of the mobile relay node to the mobile relay node through the DeNB transparently and a packet destined to the UEs is encapsulated into the stream control transmission protocol/GPRS tunneling protocol (SCTP/GTP) spanned between S-GW/P-GW of the mobile relay node and the mobile relay node.

Figure 9:
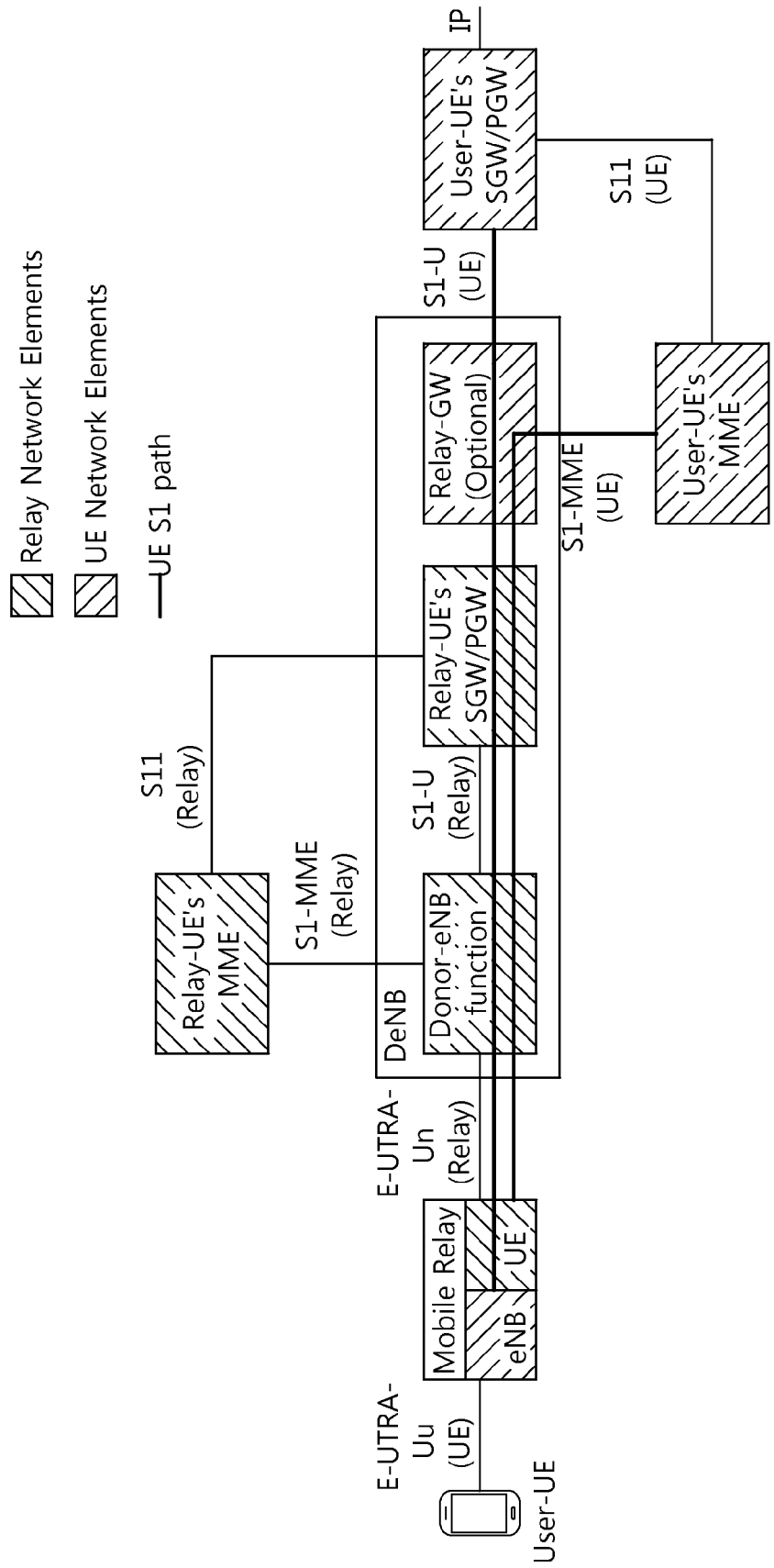
FIG. 9 shows another example of mobile relay node architecture.

FIG. 9 shows another example of mobile relay node architecture.

Referring to FIG. 9, a mobile relay node has both an eNB network element and a UE network element. That is, the mobile relay node supports eNB functionalities and UE functionalities. Also, an S-GW/P-GW of the mobile relay node and an optional relay GW are located in a DeNB where the mobile relay node attaches for normal operation to support the mobile relay. In this case, the DeNB supporting the mobile relay node can know the control signal and the data traffic related to the UEs connected to the mobile relay node. That is, the DeNB knows contexts of UEs attached to the mobile relay node. It is because that the DeNB is able to interpret the control signal and the data traffic related to the UEs passing through the DeNB.

In a current handover procedure for a general UE, if a target eNB has no resource to allocate a default bearer to a UE which requests handover, the target eNB rejects the handover request of the UE. In other words, if the UE cannot get a default bearer in the target eNB, it is not able to perform handover to the target eNB. It means that, in case of mobile relay handover procedure, UEs which cannot be provided resources for their default bearers in the target DeNB may not be able to be served anymore after the mobile relay node serving the UEs completes handover to the target DeNB. Therefore, UE connection failure may occur.

Figure 10:
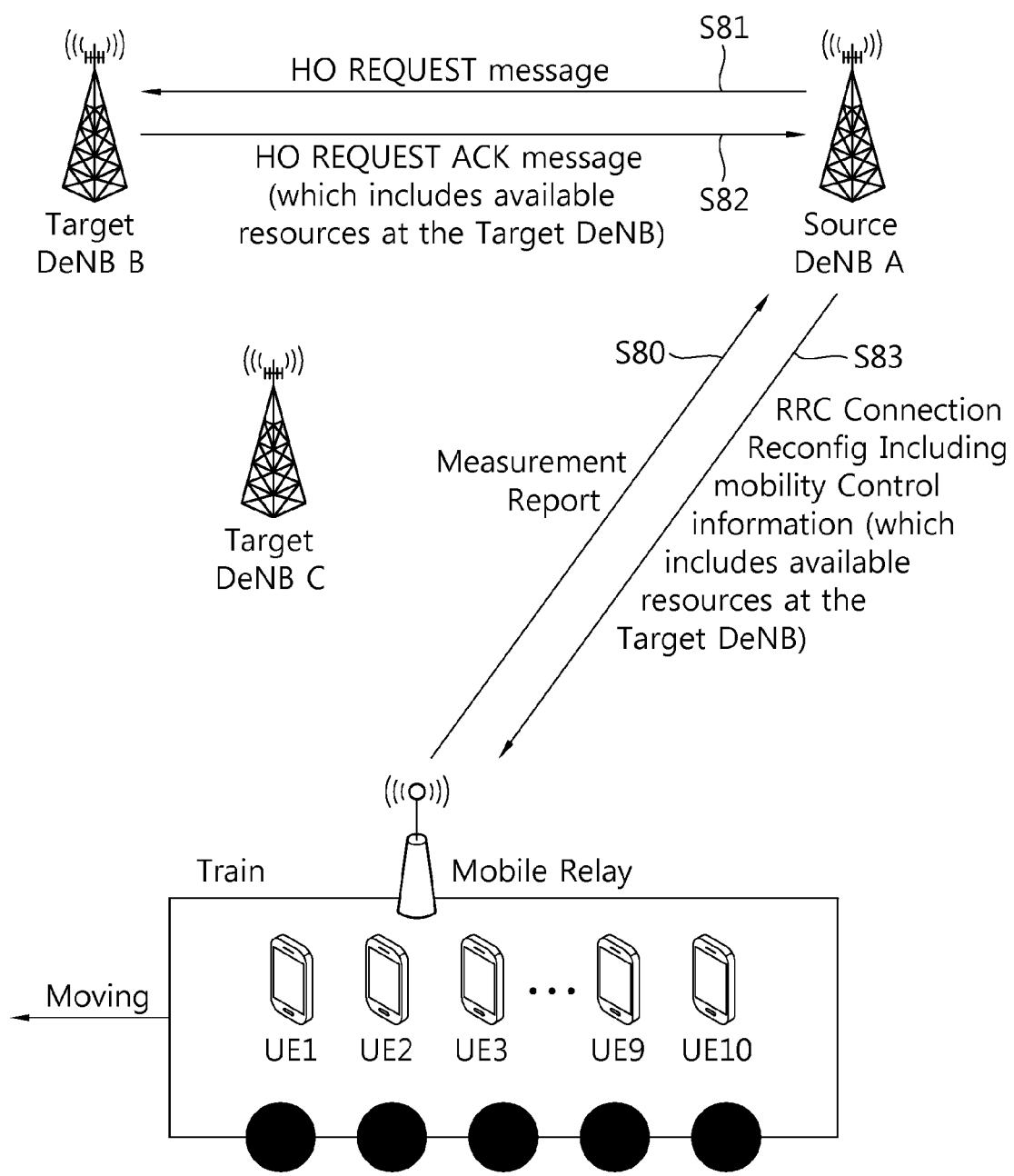
FIG. 10 shows an example of handover procedure for a mobile relay node.

FIG. 10 shows an example of handover procedure for a mobile relay node.

Referring to FIG. 10, a mobile relay node is deployed in a high speed train, and serves UEs in the high speed train. As the mobile relay node moves fast, the mobile relay node tries to handover from a source DeNB A to a target DeNB B. A target eNB C is a current candidate node to which UEs, attached to the mobile relay node, in the high speed train can be handed over.

At step S80, the mobile relay node transmits a measurement report to the source DeNB A.

At step S81, the source DeNB A transmits a handover request message to the target DeNB B. At Step S82, the target DeNB B transmits a handover request acknowledgement (ACK) message to the source DeNB A as a response to the handover request message. The handover request ACK message may include available resource, which can be allocated to the mobile relay node and UEs in the high speed train, at the target DeNB B.

At step S83, the source DeNB A transmits a radio resource control (RRC) connection reconfiguration message to the mobile relay node. The RRC connection reconfiguration message may include available resource at the target DeNB B.

After receiving the RRC connection reconfiguration message including available resource at the target DeNB B, the mobile relay node can know whether the target DeNB B can support UEs attached to the mobile relay node. If the target DeNB B does not have enough resource to allocate a default bearer to UEs in the high speed train, some of UEs cannot be handed over to the target DeNB. In this case, some of UEs can be handed over to the target eNB C.

Figure 11:
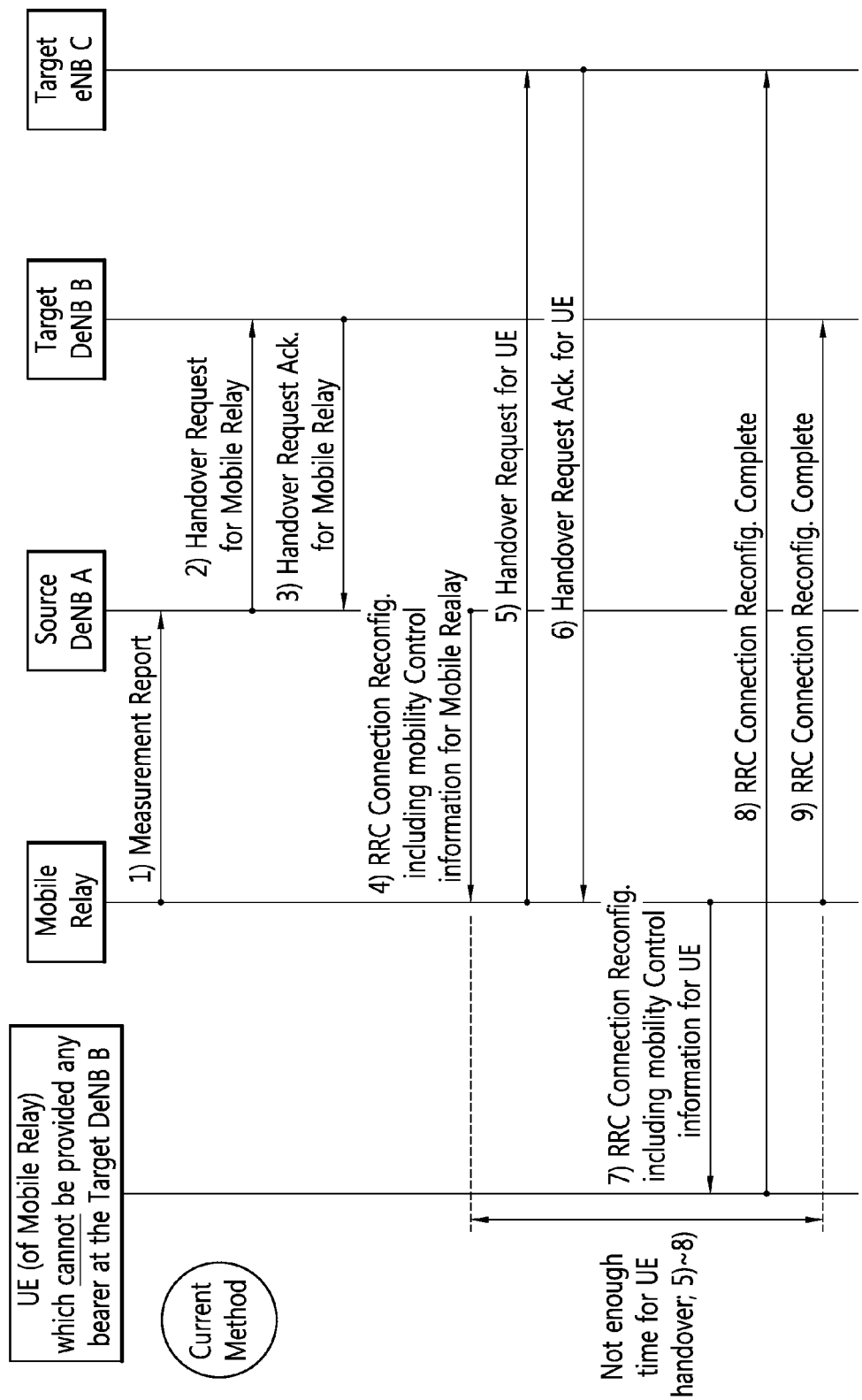
FIG. 11 shows an example of handover procedure for a mobile relay node and a UE.

FIG. 11 shows an example of handover procedure for a mobile relay node and a UE.

1) First, handover procedure for the mobile relay node is performed. The mobile relay node transmits a measurement report to a source DeNB A.

2) The source DeNB A transmits a first handover request message for the mobile relay node to a target DeNB B.

3) The target DeNB B transmits a first handover request ACK message for the mobile relay node to the source DeNB as a response to the first handover request message. The first handover request ACK message may include available resource at the target DeNB B.

4) The source DeNB A transmits a first RRC connection reconfiguration message including mobility control information for the mobile relay node to the mobile relay node. The first RRC connection reconfiguration message may include available resource at the target DeNB B.

5) It is assumed that a UE, attached to the mobile relay node, cannot be provided any bearer at the target DeNB B. The mobile relay node can know that the UE cannot be provided any bearer at the target DeNB B on receiving the first RRC connection reconfiguration message. Accordingly, handover procedure for the UE is performed. The mobile relay node transmits a second handover request message for the UE to a target eNB C.

6) The target eNB C transmits a second handover request ACK message for the UE to the mobile relay node as a response to the second handover request message.

7) The mobile relay node transmits a second RRC connection reconfiguration message, to the UE, including mobility control information for the UE. The second RRC connection reconfiguration message may indicate the UE to perform handover to the target eNB C.

8) The UE performs handover to the target eNB C, and transmits an RRC connection reconfiguration complete message to the target eNB C.

9) The mobile relay node transmits an RRC connection reconfiguration complete message to the target DeNB B.

As described above, the handover procedure for the mobile relay node and the UE mat follow current handover mechanism. The problem is that only after handover preparation procedure, the mobile relay node can know that the target DeNB B is not able to provide resources for some UEs. That is, before receiving the first RRC connection reconfiguration message from the source DeNB A at 4), the mobile relay node cannot know whether all or some UEs can be served continuously after the mobile relay node completes handover to the target DeNB B.

If some UEs cannot be served by the mobile relay node continuously after the mobile relay node completes handover to the target DeNB B, they should be handed over to the target eNB C. However, there is not enough time to handover UEs to the target eNB C. That is, duration from 4) to 9), which is duration from that the mobile relay node know that the target DeNB B is not able to provide resources for some UEs, to that the mobile relay node completes handover to the target DeNB B, is generally not enough to hand over some UEs served by the mobile relay node to target eNB C.

Or, if the target DeNB B does not support some UE's public land mobile network (PLMN), the mobile relay node should handover these UEs to the target eNB C, and in this case similarly, the mobile relay node does not have time enough to complete handover for these UEs in same reason described above.

To solve the problem described above, various methods may be proposed according to embodiments of the present invention.

Figure 12:
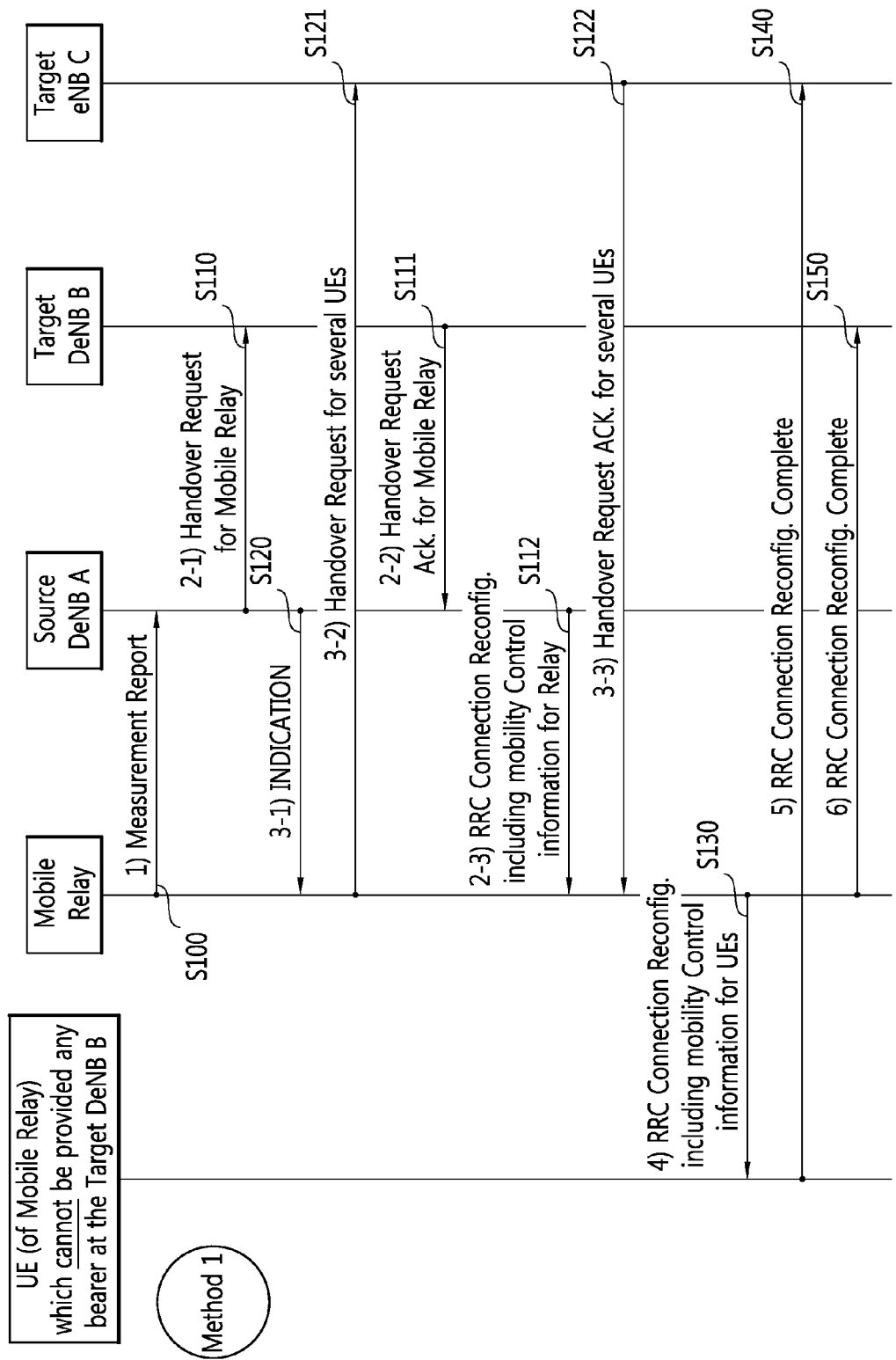
FIG. 12 shows an example of a method for transmitting an indication according to an embodiment of the present invention.

FIG. 12 shows an example of a method for transmitting an indication according to an embodiment of the present invention.

First, handover procedure for the mobile relay node is performed. At step S100, a mobile relay node transmits a measurement report to a source DeNB A. At step S110, the source DeNB A transmits a first handover request message for the mobile relay node to a target DeNB B.

On transmitting the first handover request message to a target DeNB B, at step S120, the source DeNB A transmits an indication to the mobile relay node, which informs that the source DeNB A tries to handover the mobile relay node.

After receiving the indication from the source DeNB A, the mobile relay node initiates handover preparation procedure to a target eNB C for several UEs in order to prepare for the case that some UEs cannot be served at the target DeNB B, before the mobile relay node can know whether the target DeNB B has enough resource to allocate a bearer to several UEs exactly. That is, the mobile relay node unconditionally prepares to handover some UEs to the target eNB C regardless of whether the target DeNB B can provide resources for several UEs. Therefore, at step S121, the mobile relay node transmits a second handover request message for the several UEs to the target eNB C.

Back to the handover procedure for the mobile relay node, at step S111, the target DeNB B transmits a first handover request ACK message for the mobile relay node to the source DeNB as a response to the first handover request message. The first handover request ACK message may include available resource at the target DeNB B. At step S112, the source DeNB A transmits a first RRC connection reconfiguration message, to the mobile relay node, including mobility control information for the mobile relay node. The first RRC connection reconfiguration message may include available resource at the target DeNB B.

At step S122, the target eNB C transmits a second handover request ACK message for the several UEs to the mobile relay node as a response to the second handover request message.

Step S110 to S112, and step S120 to S112 described above may be performed simultaneously and/or independently. That is, the handover procedure for the mobile relay node and the handover procedure for the several UEs may be performed simultaneously and/or independently.

When the mobile relay node receives the first RRC connection reconfiguration message from the source DeNB A at step S112, and if some UEs cannot be served at the target DeNB B, then, the mobile relay nodes commands handover to some UEs among UEs which are allowed to be handed over to the target eNB C by the second handover request ACK message. Therefore, at step S130, the mobile relay node transmits a second RRC connection reconfiguration message, to the UE, including mobility control information for the UE. The second RRC connection reconfiguration message may indicate the UE to perform handover to the target eNB C.

At step S140, the UE performs handover to the target eNB C, and transmits an RRC connection reconfiguration complete message to the target eNB C. At step S150, the mobile relay node transmits an RRC connection reconfiguration complete message to the target DeNB B.

Figure 13:
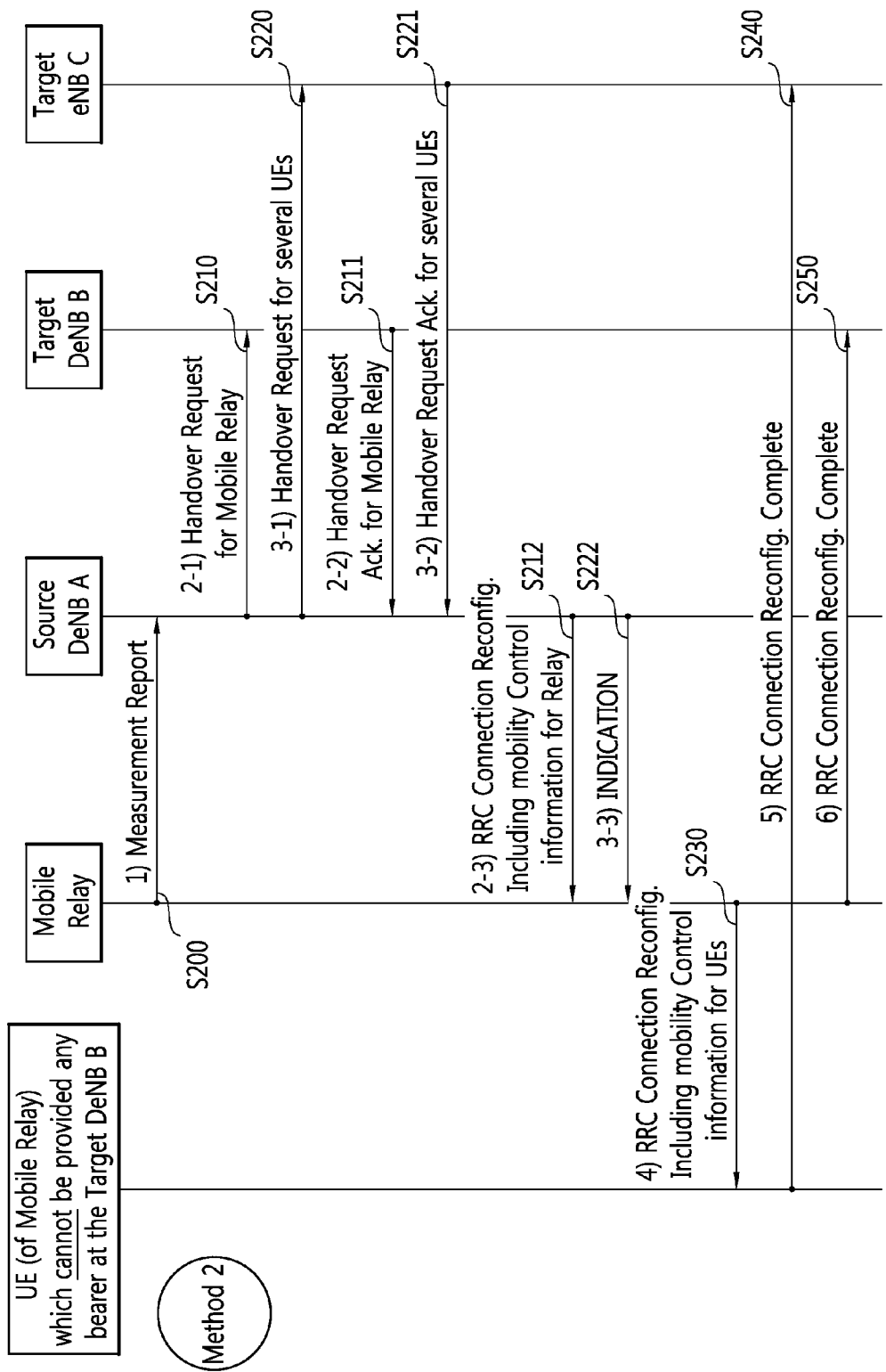
FIG. 13 shows another example of a method for transmitting an indication according to an embodiment of the present invention.

FIG. 13 shows another example of a method for transmitting an indication according to an embodiment of the present invention.

First, handover procedure for the mobile relay node is performed. At step S200, a mobile relay node transmits a measurement report to a source DeNB A. At step S210, the source DeNB A transmits a first handover request message for the mobile relay node to a target DeNB B.

On transmitting the first handover request message to a target DeNB B, at step S220, the source DeNB A transmits a second handover request message for several UEs to a target eNB C at the same time. That is, the source DeNB initiates handover preparation procedure to the target eNB C for the several UEs in order to prepare for the case that some UEs cannot be served at the target DeNB B, before knowing whether the target DeNB B has enough resource to allocate a bearer to several UEs exactly.

In this case, it is assumed that the source DeNB A can estimate radio environments of UEs based on the measurement report received from the mobile relay node, and by the measurement report, the source DeNB A can decide which eNB would be a target eNB for the UEs as well. That is, the source DeNB A needs to know contexts of UEs attached to the mobile relay node, which is disclosed in the mobile relay node architecture in FIG. 9.

At step S211, the target DeNB B transmits a first handover request ACK message for the mobile relay node to the source DeNB as a response to the first handover request message. The first handover request ACK message may include available resource at the target DeNB B. At step S221, the target eNB C transmits a second handover request ACK message for the several UEs to the source DeNB A as a response to the second handover request message. At step S212, the source DeNB A transmits a first RRC connection reconfiguration message, to the mobile relay node, including mobility control information for the mobile relay node. The first RRC connection reconfiguration message may include available resource at the target DeNB B.

At step S222, the source DeNB A transmits an indication including information on lists of UEs which can be handed over to the target eNB C. The lists of UEs which can be handed over to the target eNB C may be lists of UEs which are allowed to be handed over to the target eNB C by the second handover request ACK message. Or, the lists of UEs which can be handed over to the target eNB C may be lists of UEs which are decided to be hand over to the target eNB C by the source DeNB A after receiving the second handover request ACK message. The indication may be included in the first RRC connection reconfiguration message.

That is, in this case, instead that the mobile relay node prepares for the case that some UEs cannot be served at the target DeNB B unconditionally, the source DeNB A can decide whether some UEs needs to be handed over to the target eNB C.

Step S210 to S212, and step S220 to S222 described above may be performed simultaneously and/or independently. That is, the handover procedure for the mobile relay node and the handover procedure for the several UEs may be performed simultaneously and/or independently.

When the mobile relay node receives the first RRC connection reconfiguration message from the source DeNB A at step S212, and if some UEs cannot be served at the target DeNB B, then, the mobile relay nodes commands handover to some UEs among UEs which can be handed over to the target eNB C by the indication. Therefore, at step S230, the mobile relay node transmits a second RRC connection reconfiguration message, to the UE, including mobility control information for the UE. The second RRC connection reconfiguration message may indicate the UE to perform handover to the target eNB C.

At step S240, the UE performs handover to the target eNB C, and transmits an RRC connection reconfiguration complete message to the target eNB C. At step S250, the mobile relay node transmits an RRC connection reconfiguration complete message to the target DeNB B.

Figure 14:
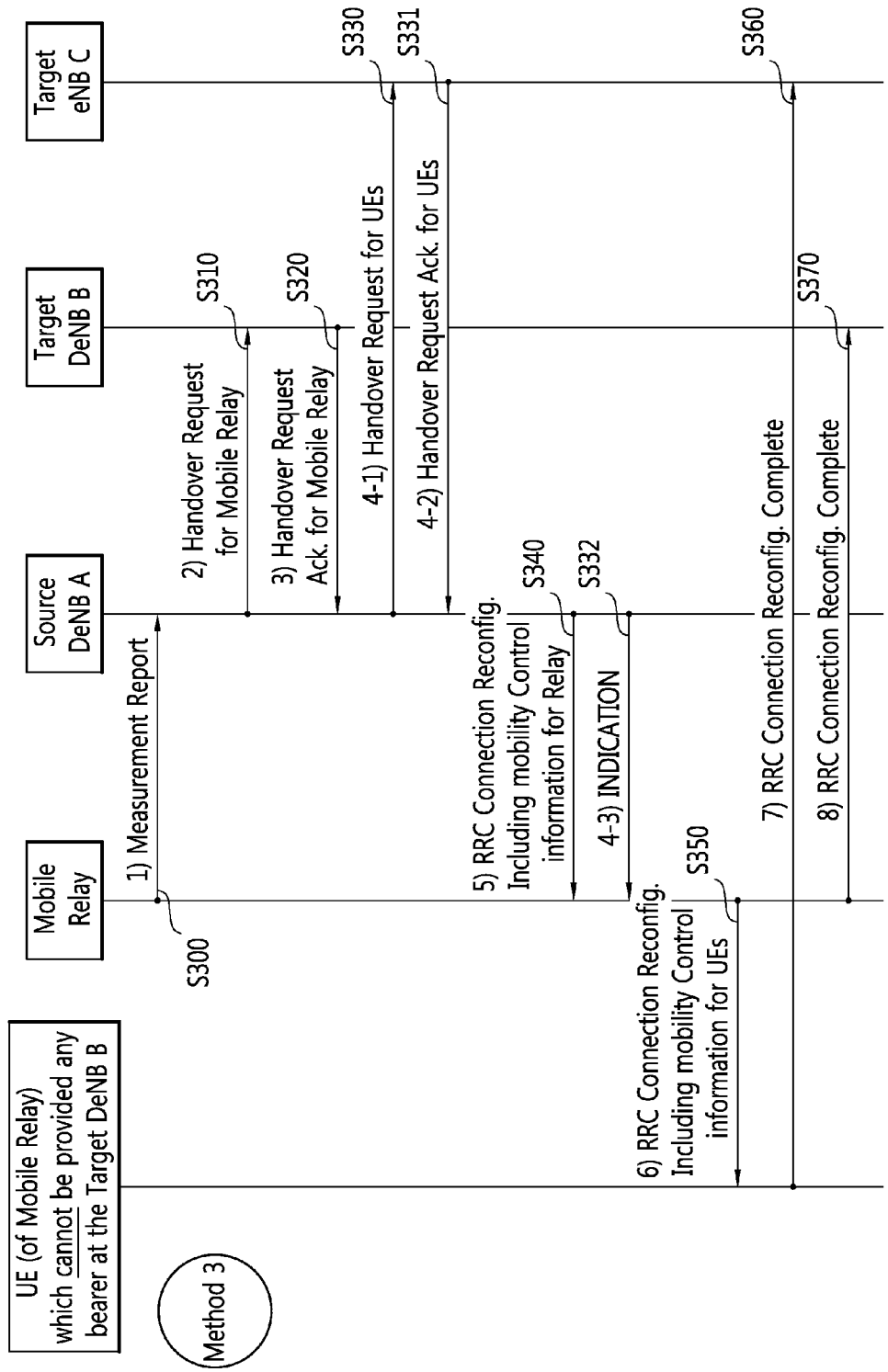
FIG. 14 shows another example of a method for transmitting an indication according to an embodiment of the present invention.

FIG. 14 shows another example of a method for transmitting an indication according to an embodiment of the present invention.

First, handover procedure for the mobile relay node is performed. At step S300, a mobile relay node transmits a measurement report to a source DeNB A. At step S310, the source DeNB A transmits a first handover request message for the mobile relay node to a target DeNB B. At step S321, the target DeNB B transmits a first handover request ACK message for the mobile relay node to the source DeNB as a response to the first handover request message. The first handover request ACK message may include available resource at the target DeNB B.

After the source DeNB A transmits the first handover request message to the target DeNB B, and receives the first handover request ACK message, at step S330, the source DeNB A transmits a second handover request message for UEs which cannot be served in the target DeNB B to a target eNB C. That is, the source DeNB initiates handover preparation procedure to the target eNB C for the UEs in order to prepare for the case that some UEs cannot be served at the target DeNB B, after knowing whether the target DeNB B has enough resource to allocate a bearer to several UEs exactly.

In this case, it is assumed that the source DeNB A can estimate radio environments of UEs based on the measurement report received from the mobile relay node, and by the measurement report, the source DeNB A can decide which eNB would be a target eNB for the UEs as well. That is, the source DeNB A needs to know contexts of UEs attached to the mobile relay node, which is disclosed in the mobile relay node architecture in FIG. 9.

At step S331, the target eNB C transmits a second handover request ACK message for the UEs to the source DeNB A as a response to the second handover request message. At step S340, the source DeNB A transmits a first RRC connection reconfiguration message, to the mobile relay node, including mobility control information for the mobile relay node. The first RRC connection reconfiguration message may include available resource at the target DeNB B.

After receiving the second handover request ACK message, at step S332, the source DeNB A transmits an indication including information on lists of UEs which can be handed over to the target eNB C. The lists of UEs which can be handed over to the target eNB C may be lists of UEs which are allowed to be handed over to the target eNB C by the second handover request ACK message. Or, the lists of UEs which can be handed over to the target eNB C may be lists of UEs which are decided to be hand over to the target eNB C by the source DeNB A after receiving the second handover request ACK message. The indication may be included in the first RRC connection reconfiguration message.

That is, in this case, instead that the mobile relay node prepares for the case that some UEs cannot be served at the target DeNB B unconditionally, the source DeNB A can decide whether some UEs needs to be handed over to the target eNB C.

When the mobile relay node receives the first RRC connection reconfiguration message from the source DeNB A at step S340, and if some UEs cannot be served at the target DeNB B, then, the mobile relay nodes commands handover to some UEs among UEs which can be handed over to the target eNB C by the indication. Therefore, at step S350, the mobile relay node transmits a second RRC connection reconfiguration message, to the UE, including mobility control information for the UE. The second RRC connection reconfiguration message may indicate the UE to perform handover to the target eNB C.

At step S360, the UE performs handover to the target eNB C, and transmits an RRC connection reconfiguration complete message to the target eNB C. At step S370, the mobile relay node transmits an RRC connection reconfiguration complete message to the target DeNB B.

Figure 15:
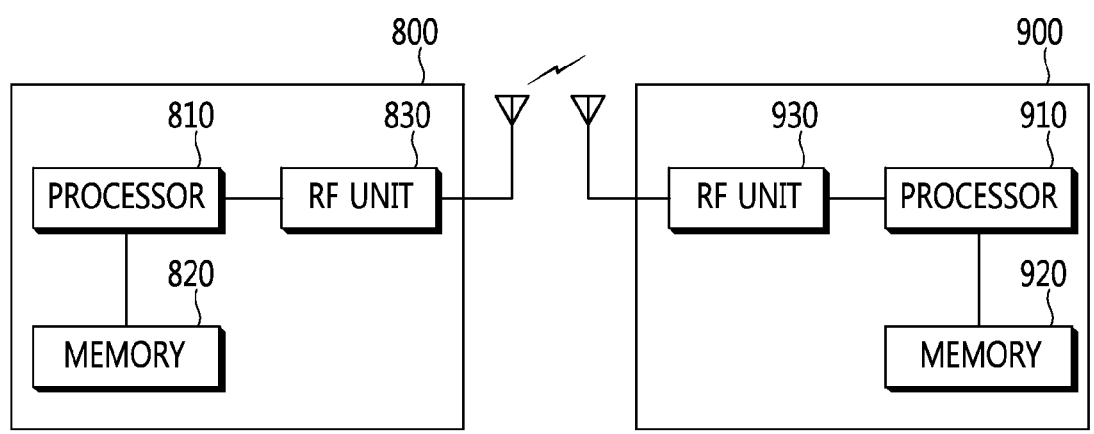
FIG. 15 is a block diagram showing wireless communication system to implement an embodiment of the present invention.

FIG. 15 is a block diagram showing wireless communication system to implement an embodiment of the present invention.

A mobile relay node 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A donor eNB 900 may include a processor 910, a memory 920 and a RF unit 930. The processor 910 may be configured to implement proposed functions, procedures, and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a source donor eNodeB (DeNB), an indication in a wireless communication system, the method comprising:
    transmitting a first handover request message for a mobile relay node, to a target DeNB;
    transmitting a second handover request message for user equipments (UEs) attached to the mobile relay node, to a target eNB; and
    transmitting an indication including information on lists of UEs which can be handed over to the target eNB, to the mobile relay node.

2. The method of claim 1, wherein the information on the lists of the UEs which can be handed over to the target eNB are lists of UEs which are allowed, by the target eNB, to be handed over to the target eNB.

3. The method of claim 1, wherein the information on the lists of the UEs which can be handed over to the target eNB are lists of UEs which are decided, by the source DeNB, to be handed over to the target eNB.

4. The method of claim 1, wherein the first handover request message and the second handover request message are transmitted at the same time.

5. The method of claim 1, wherein the second handover request message is transmitted after the source DeNB transmits the first handover request message to the target DeNB and receives a first handover request acknowledgement message from the target DeNB.

6. The method of claim 5, wherein the first handover request acknowledgement message includes available resource at the target DeNB.

7. The method of claim 5, wherein the second handover request message is for UEs which cannot be served by the target DeNB.

8. The method of claim 1, further comprising a radio resource control (RRC) connection reconfiguration message, to the mobile relay node, including mobility control information for the mobile relay node.

9. The method of claim 8, wherein the indication is transmitted by being included in the RRC connection reconfiguration message.

10. A method for indicating, by a mobile relay node, handover in a wireless communication system, the method comprising:
    receiving an indication including information on lists of user equipments (UEs) which can be handed over to a target eNB, from a source donor eNodeB (DeNB); and
    transmitting a first radio resource control (RRC) connection reconfiguration message, to a UE, including mobility control information for the UE, wherein the first RRC connection reconfiguration message indicates the UE to handover to the target eNB.

11. The method of claim 10, wherein the information on the lists of the UEs which can be handed over to the target eNB are lists of UEs which are allowed, by the target eNB, to be handed over to the target eNB.

12. The method of claim 10, wherein the information on the lists of the UEs which can be handed over to the target eNB are lists of UEs which are decided, by the source DeNB, to be handed over to the target eNB.

13. The method of claim 10, further receiving a second RRC connection reconfiguration message, from the source DeNB, including mobility control information for the mobile relay node.

14. The method of claim 13, wherein the indication is received by being included in the second RRC connection reconfiguration message.

15. The method of claim 10, further transmitting an RRC connection reconfiguration complete message to a target DeNB.

* * * * *